US006609328B2

(12) United States Patent
Swift et al.

(10) Patent No.: US 6,609,328 B2
(45) Date of Patent: Aug. 26, 2003

(54) ELECTRONIC ANIMAL TRAP (75) Inventors: David W. Swift, Lititz, PA (US);
Christopher T. Rich, Lancaster, PA (US)

(73) Assignee: Woodstream Corporation, Lititz, PA (US)

( * ) Notice: Subject to any disclaimer, the term of this patent is extended or adjusted under 35 U.S.C. 154(b) by 0 days.

(21) Appl. No.: 10/043,161

(22) Filed: Jan. 14, 2002

(65) Prior Publication Data
US 2003/0131522 A1 Jul. 17, 2003

(51) Int. Cl.[7] ............................................. A01M 23/02
(52) U.S. Cl. ........................................................ 43/98
(58) Field of Search ................................ 43/58, 61, 67, 43/98, 99

(56) References Cited

U.S. PATENT DOCUMENTS

| | | | | |
|---|---|---|---|---|
| 912,203 | A | * 2/1909 | Swasey | 43/98 |
| 1,029,551 | A | * 6/1912 | Molnar | 43/99 |
| 1,044,490 | A | * 11/1912 | Cessna | 43/99 |
| 1,074,770 | A | * 10/1913 | Beardsley | 43/98 |
| 1,175,797 | A | * 3/1916 | Newell | 43/98 |
| 2,161,789 | A | * 6/1939 | Wingfield | 43/98 |
| 3,197,916 | A | * 8/1965 | Cole | 43/98 |
| 4,103,448 | A | 8/1978 | Souza | |
| 4,138,796 | A | 2/1979 | Souza | |
| 4,144,667 | A | 3/1979 | Souza | |
| 4,205,480 | A | * 6/1980 | Gartner | 43/98 |
| 4,253,264 | A | 3/1981 | Souza | |
| 4,497,130 | A | * 2/1985 | Fitzgerald | 43/98 |
| 4,550,523 | A | 11/1985 | Spiller | |
| 4,780,985 | A | * 11/1988 | Coots | 43/98 |
| 5,269,091 | A | 12/1993 | Johnson et al. | |
| 5,369,907 | A | * 12/1994 | Lee | 43/98 |
| 5,406,742 | A | * 4/1995 | Allen | 43/98 |
| 5,949,636 | A | 9/1999 | Johnson et al. | |
| 5,953,853 | A | * 9/1999 | Kim | 43/98 |

FOREIGN PATENT DOCUMENTS

| | | | | |
|---|---|---|---|---|
| CA | 1107504 | | 8/1981 | |
| FR | 002689371 A1 | * | 10/1993 | 43/98 |
| GB | 2107164 A | * | 4/1983 | 43/98 |
| WO | 092000671 A | * | 1/1992 | 43/98 |

* cited by examiner

Primary Examiner—Kurt Rowan
(74) Attorney, Agent, or Firm—Jacobson Holman PLLC (57) ABSTRACT An electronic animal trap incorporating an inclined plane trap assembly is capable to preclude an animal on the tilting floor member of the trap assembly from engaging the top and/or side edges of the door member of the trap assembly in an attempt to escape from the trap by pulling the door member down to thereby unblock access to the entrance opening. An electronic circuit is connected to a bottom plate so that when animal's weight causes the inclined ramp to lower and contact the bottom plate the circuit is completed and the animal receives a charge of sufficient power to cause electrocution. A plastic version of the electronic animal trap assembly enables many of the structural elements to be economically manufactured and easily assembled.

14 Claims, 4 Drawing Sheets

ELECTRONIC ANIMAL TRAP

BACKGROUND OF THE INVENTION

1. Field of the Invention

The invention relates electric or electronic animal traps, and relates more particularly to an animal trap of the inclined plane type adapted to catch and electrocute a targeted animal.

Although the concepts of the instant invention are equally applicable to traps for animals of any size, devices of this type are primarily utilized in connection with the trapping of rodents such as mice and rats and, therefore, further discussion herein will be primarily directed to this application.

2. The Prior Art

Inclined plane animal traps have been available for over one hundred years. The commercial embodiments of such traps currently available commonly comprise a housing defining an enlarged enclosure with one, or perhaps two, inclined plane trap assemblies communicating the interior of the enclosure with the exterior of the housing via an elongated passageway. An inclined plane tilting floor member is positioned in the passageway of each trap assembly and is adapted to lift a door to block an entrance opening when the rodent passes beyond a pivot point thereby limiting escape from the enclosure. When the rodent exits the passageway into the enclosure the door falls by gravity on the entrance end of the tilting floor to reset the trap and the raised end of the tilting floor limits the ability of a captured rodent to return to the passageway.

Captured rodents will attempt to escape in any way possible. Rodents in the enclosure will try to grasp the inner end of the tilting floor to regain access to the passageway. In some instances, rodents on the tilting floor have been able to grasp the side of top edges of the door with their claws or teeth to pull the door down against their own weight, and thereby escape from the trap.

Attempts have been made to limit access to the tilting floor and the door by incorporation of various flanges or lips on the trap assembly walls or roof, but such efforts have had limited success. Since the principle purpose of an animal trap is to capture and retain the targeted animals for subsequent disposition by an exterminator or the like, the effectiveness of a trap that permits escape of a captured animal is greatly diminished and a construction that is, for all intents and purposes, escape-proof, would have significant commercial appeal.

Another problem associated with animal traps is the tendency of a captured rodent to crawl under, or nest in the space between the bottom wall of the trap housing and the undersurface of the raised end of the tilting floor when the trap assembly has been reset. The presence of an animal in this location prevents another rodent attempting to enter the trap assembly from tilting the floor and, thereby, being captured. Provision of a member to preclude an animal from entering or nesting in this space would be an obviously desirable feature of an animal trap.

It is well known tendency of mice and rats to stay close to walls in a room, rather than running into the open. If a rodent trap is set against a wall with the entrance opening juxtaposed to the wall, the aroma of bait in the housing will generally attract the animal into the trap. However, some rodents will pass by the entrance opening and, thereby, avoid being caught.

Since some animal traps are generally intended for multiple uses, they have been commonly made of sheet metal, such as aluminum sheet or the like, for durability. While some traps made of plastic have been marketed, the ability to produce an animal trap which is virtually escape-proof, with the major components being formed of plastic, would significantly reduce manufacturing costs and enhance versatility.

The trap of the application Ser. No. 09/729,832 filed Dec. 6, 2000, the subject matter of which is incorporated herein in its entirety by reference, has been designed to overcome the defects in most prior art inclined plane animal traps and provides an escape-proof repeating animal trap with many advantages.

There have also been attempts to develop animal traps including electric or electronic components to kill a trapped animal. These traps, so far, have very complicated structures which are costly to manufacture. Additionally, these traps are not conveniently employed without disruption of the animal's environment nor are they able to control the voltage to the trap. Some are designed, to provide continuous power which is not cost effective and others can not keep the animal in the trap, because the animal can grasp the top of a side edge of the trap door and scratch or chew its way out.

In U.S. Pat. No. 5,269,091 to Johnson et al, a flexible plate is charged with a base plate. When the pest enters the trap, the pest presses the flexible plate into contact with the base plate. This contact completes the circuit and a high voltage is applied to the pest. The problem with this type of device is that voltage only occurs when the pest makes contact with the flexible plate. When the pest initially is shocked it will move and not receive enough of a shock to exterminate it. The trap door is non-existing and the pest can readily escape, thus defeating the purpose of the trap.

In an attempt to solve the previously noted electrical problem, U.S. Pat. No. 5,949,636 to Johnson et al discloses a portable pest electrocution device with a resistive switch trigger. The device has a resistive switch to sense the presence of a pest between two electrodes. One of the electrodes is set at a high voltage and the other is set to ground. The ground electrode is a separate stake shaped electrode which is placed physically in the ground. When the pest enters the trap, contact is made, and a timer begins for a set period of time. After timing out, the timer deactivates the power to the electrodes. A problem with this device is that a separate ground stake is necessary. It is costly and cumbersome. If the user forgets or misplaces the separate ground stake, the device does not work correctly and thus will be useless.

While the noted prior art patents show electronic members in a trap, none of the patents disclose a combination of an electronic circuit fixed in a trap with a teeter-totter mechanism to securely close the trap door, and thus readily exterminating the pest by electrocution.

SUMMARY OF THE INVENTION

Previous electric mouse killing traps had deficiencies regarding the safety features and the reliability of the device. The device of the present invention has a door which closes mechanically as the circuit completes thus reducing the chances that children, pests or non target species can inadvertently fire the trap and potentially cause harm to themselves. The door also creates a situation where there is only one possible outcome once the mouse enters the trap. The mouse can not back out of the trap. Therefore, it will complete the circuit resulting in the death of the animal.

It is an object of the invention to provide a unique electric animal trap incorporating features that render the same essentially escape-proof because, for all practical purposes, once the animal steps into the trap, the inclined plane will tip and the animal will be electrocuted. However, if desired, elements may be provided to preclude a captured animal on the tilting floor from grasping the top or side edges of the trap door to prevent the animal from unblocking the entrance opening.

It is another object of the invention to provide an electric or electronic animal trap including a housing with a bottom wall, upstanding peripheral walls, and a cover, together defining an enclosure for holding at least one targeted animal with contacts on portions of the peripheral walls and cover adapted to open or "break" the circuitry when the cover is lifted thereby avoiding accidental injury to a person contacting the electrodes when accessing the enclosure to add bait or to remove electrocuted animals.

It is an object of the invention to provide movable portions of the housing between a closed position in which the captured animal is retained within the enclosure, and an opened position in which access is provided to the enclosure to remove electrocuted animals therefrom.

It is a further object of the invention to provide at least one inclined plane trap assembly including sides defining an elongated passageway, an entrance opening at one end of the passageway communicating with the exterior of the housing through an aperture in one of the peripheral walls of the housing, and a back wall at the other end of the of the passageway.

Another object of the invention is to provide a floor member extending along the passageway intermediate the sides, the floor member having a first end portion juxtaposed to the entrance opening and an opposite second end portion juxtaposed to the back wall.

It is a further object of the invention to provide a pivot element underlying and supporting the floor member intermediate its end portions for tilting movement of the floor member between a first position in which the first end portion is lowered and the second end portion is raised, and a second position in which the first end portion is raised and the second end portion is lowered.

A still further object of the invention to provide a door member having bottom edge portions and a top edge, a hinge element secured to the bottom edge portions of the door member adjacent to the entrance opening for pivotal movement of the door member between a lowered position in which the door member rests on the first end portion of the floor member when the floor member is in its first position to provide access to the passageway by a targeted animal through the entrance opening.

It is a further object of the invention to provide the door member in a raised position that is lifted by movement of the first end portion of the floor member when the floor member is moved from its first position to its second position.

It is a further object of the invention to provide the door member, in its raised position, for blocking the return to the entrance opening by the animal on the floor member.

It is a further object of the invention to provide, the door member being biased toward its lowered position, the weight of the door member on the first end portion of the floor member when the door member is in its lowered position maintaining the floor member in its first position, and the weight of an animal on the floor member tilting the floor member to its second position when the animal passes from the entrances opening beyond the pivot element to thereby lift the door member to its raised position.

It is a further object of the invention to provide a power supply for providing power to the trap.

It is a further object of the invention to provide a bottom plate positioned near the back wall and extending parallel to the bottom wall with a portion of the bottom plate being in contact with the floor member when the floor member is moved from its first position to its second position.

It is a further object of the invention to provide a circuit member electrically connected to the power supply for converting said power to electricity.

It is a further object of the invention to provide for a floor electrical connection member to receive the electricity from the circuit member and connecting to the floor member to provide electricity to the floor member.

It is a further object of the invention to provide for the bottom electrical connection member to receive the electricity from the circuit member and connecting to the bottom plate to provide electricity to the bottom plate and the weight of the animal on the floor member tilting the floor member to its second position when the animal passes from the entrance opening beyond the pivot element to thereby lift the door member to its raised position to eliminate an exit of the animal from the trap.

It is a further object of the invention to provide for the bottom plate to electrically contact the floor member to cause the electricity to flow through the bottom plate and the floor member to electrocute the animal in contact with the floor member.

It is a further object of the invention to provide for the top edge of the door member to engage the undersurface of the roof when the door member reaches a vertical orientation whereby the weight of the door member biases the door member about the hinge element towards the lowered position.

It is a further object of the invention to provide a rectangular housing with the peripheral walls of the housing including a pair of opposed, parallel side walls and a pair of opposed parallel end walls, one aperture in one of said end walls and a trap assembly inside the housing, the trap assembly having an entrance opening communicating with the aperture.

It is a further object of the invention to provide for portions of the cover of the housing to define the roof of the trap assembly passageway, a circuit area and a power supply area.

It is a further object of the invention to provide for portions of the peripheral walls of the housing to define the sides of the trap assembly passageway.

It is a further object of the invention to provide for portions of the peripheral walls of the housing to define one of the sides of the trap assembly circuit area.

It is a further object of the invention to provide for portions of the peripheral walls of the housing to define one of the sides of the trap assembly power supply area.

It is a further object of the invention to provide a housing formed of plastic.

It is a further object of the invention to provide a power supply comprising at least one battery.

It is a further object of the invention to provide a bottom plate formed of galvanized steel.

It is a further object of the invention to provide a floor electrical connection member comprising an insulated wire soldered to form an electrical connection.

It is a further object of the invention to provide a bottom electrical connection member is an insulated wire soldered to form an electrical connection.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The combination of elements, arrangement of parts and features of construction that lead to the inventive repeating animal trap of the instant invention will be pointed out in more detail hereinafter with respect to the accompanying drawings wherein.

Like parts are designated by like reference characters throughout the several views of the drawings. Alternate positions of the same element shown in dotted lines are designated by the same reference character followed by a prime (').

DESCRIPTION OF THE INVENTION

Although only one preferred embodiment of the invention is explained in detail, it is to be understood that other embodiments are possible. Accordingly, it is not intended that the invention is to be limited in its scope to the details of construction and arrangement of components set forth in the following description or illustrated in the drawings. The invention is capable of other embodiments and of being practiced or carried out in various ways. Also, in describing the preferred embodiment, specific terminology will be resorted to for the sake of clarity. It is to be understood that each specific term includes all technical equivalents which operate in a similar manner to accomplish a similar purpose.

Figure 1:
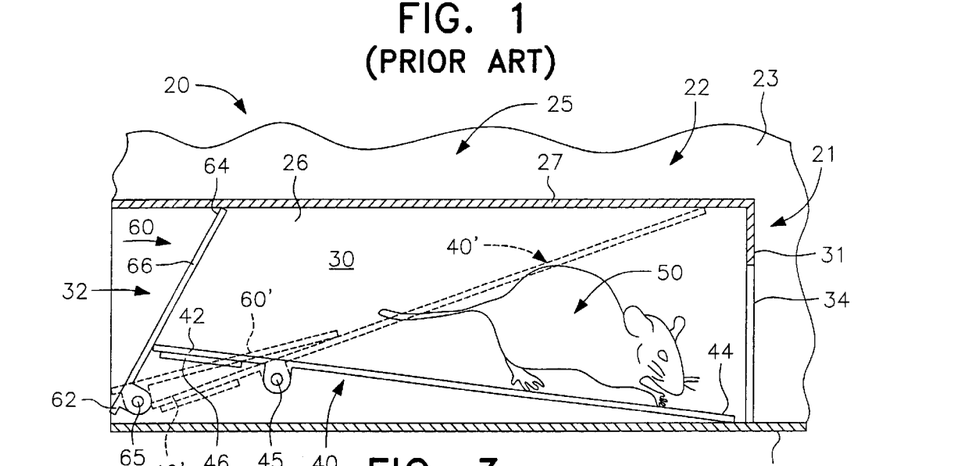
FIG. 1 is a fragmentary longitudinal cross-sectional view through a prior art embodiment of an inclined plane trap assembly in a repeating rodent trap, with the pivotal floor and door members shown in dotted lines in their alternate position.

Referring to FIG. 1, portions of an animal trap without an electronic circuit of the type seen in the aforementioned application Ser. No. 09/729,832 is designated generally by the reference numeral 20 with an inclined plane trap assembly designated generally by the reference numeral 25 therewithin.

A housing 22 includes peripheral walls, a portion of one sidewall being illustrated at 23, a bottom wall 24, and an openable cover (not shown) together defining an enlarged enclosure, generally shown at 21, for retaining one or more captured animals.

The inclined plane trap assembly 25 includes sides, one of which is shown at 26 (and may be a portion of the side wall 23 of the housing 22), and a roof 27 which, together with a portion of the bottom wall 24 of the housing 22 define an elongated passageway 30. At one end of the passageway 30 is an entrance opening 32 communicating with the exterior of the housing 22 and, at the other end of the passageway 30, is a back wall 34 communicating with the holding chamber 21 defined by the housing 22.

A floor member 40 extends along the length of the passageway 30 intermediate the sides thereof, with first end portions 42 juxtaposed to the entrance opening 32 and opposite second end portions 44 juxtaposed to the back wall 34. A pivot element 45 is fixed between the sides of the trap assembly 25 in any conventional manner and underlies and supports the floor member 40 intermediate [at] its end portions 42, 44. A counterweight 46 is secured to the underside of the first end portions 42 of the floor member 40 to manually bias the floor member 40 to a first or "open" position, shown in dotted lines in FIG. 1, in which the first end portions 42' are lowered and the second end portions 44' are raised. The pivot element 45 is offset toward the first end portions 42 to define a greater lever arm from the second end portions of the floor member 40 so that when an animal, such as the mouse or rat illustrated schematically at 50, passes the pivot element 45 on its way to the back wall 34 wherein bait can be placed, the floor member 40 is A door member 60 has bottom edge portions 62 and a top edge 64. A hinge element 65 pivotally secures the bottom edge portions 62 of the door member 60 adjacent to the entrance opening 32 for movement of the door member 60 between a lowered position, shown in dotted lines in FIG. 1, in which the door member 60' rests primarily on the first end portions 42' of the floor member 40' when the floor member 40' is in Its first position, to provide access to the passageway 30 by a targeted animal 50 through the entrance opening 32, and a raised position, shown in solid lines in FIG. 1, in which the door member 60 is lifted by movement of the first end portions 42 of the floor member 40 when the floor member 40 is moved from its first position to its second position by the weight of the animal 50 on the second end portions 44 of the floor member 40. When the door member 60 is in its raised position as shown in solid lines in FIG. 1 it tends to block any attempt by the animal 50 to return to the entrance opening 32 and, thereby, escape from the trap.

It is noted that the upper edge 64 of the door member 60 engages the undersurface of the roof 27 of the trap assembly 25 before the door member 60 reaches a vertical orientation. In this a manner, the weight of the door member 60 biases the door member 60 about the hinge element 65 toward its lowered position. Thus, when the animal 50 steps from the second end portions 44 of the floor member 40 through the exit opening 34 of the passageway 30 into the holding chamber 21 the counterweight 46 moves the floor member 40 from the second position to the first position, the door member 60 drops onto the first end portions 42 of the floor member 40, and the trap assembly 25 is automatically reset.

A problem with the inclined plane trap assemblies is the ability of a mouse or rat 50 to turn around on the floor member 40 and use its teeth or claws to grasp the top edge 64, or one of the side edges 66 of the door member 60, pulling, the same against the weight of the rodent on the second end portions 44 of the floor member, thereby moving the door member 60 to its lowered position and unblocking the entrance opening 32, permitting the animal 50 to escape from the trap.

Although the flange 31 overlying the back wall 34 from the passageway 30 tends to interfere with the ability of a captured mouse or rat within the enclosure 21 from reaching back through the back wall 34 to grasp the second end portions 44 of the floor member 40 after the trap has reset itself to pull the floor member 40 downwardly to the solid line or second position illustrated in FIG. 1 permitting the animal 50 to climb back onto the floor member 40 thereby gaining access to the door member 60 to pull the same to its lowered) position as discussed above to complete an escape from the trap, this element is inadequate to provide total protection. For that reason, the modifications shown in the '832 application may be incorporated to minimize the ability of a captured animal to access portions of the floor member or door member and, thereby, preclude escape.

Figure 2:
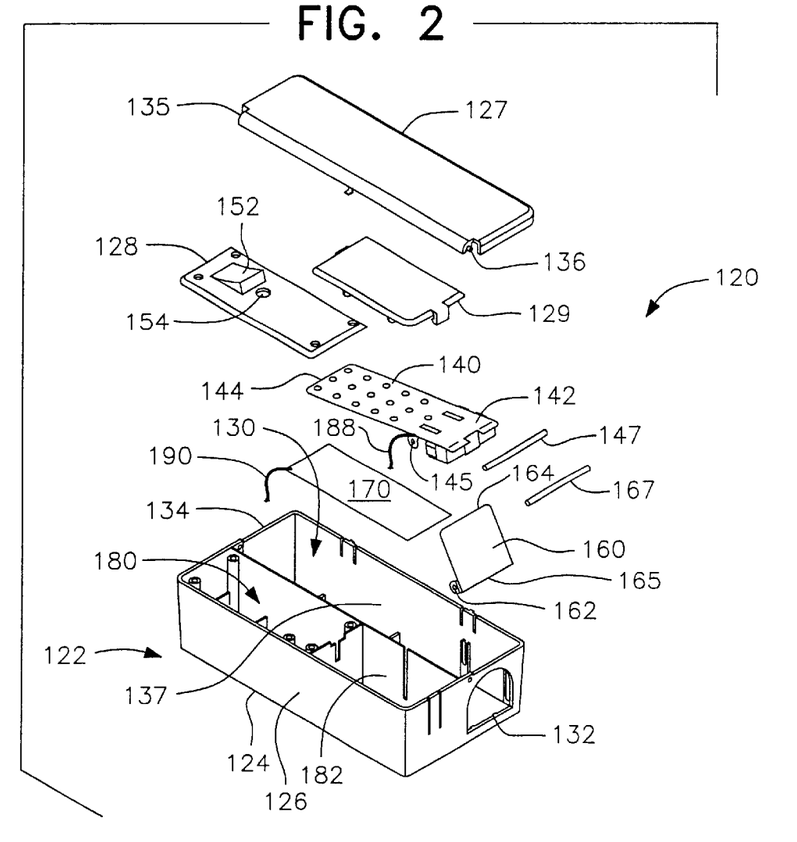
FIG. 2 is an exploded perspective view of an escape-proof electronic animal trap according to the present invention.
Figure 3:
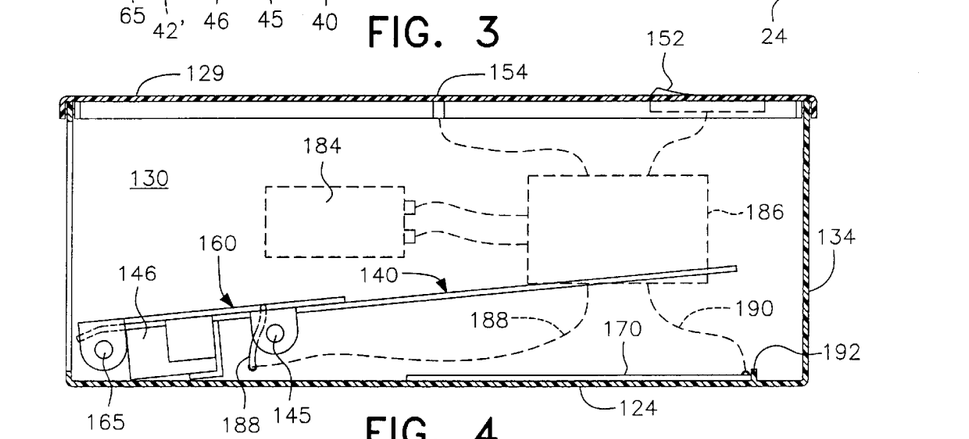
FIG. 3 is a fragmentary longitudinal cross-sectional view of the electronic animal trap of this invention with the battery and electronic circuit shown in dotted lines according to the present invention with a partial wire and ground plate shown.

FIG. 2 illustrates an exploded view of the electronic animal trap 120 of the present invention. The housing 122 is formed entirely of plastic, including the portions defining the passageway 130, only the inclined plane tilting floor member 140 and its pivot element 145 and the door member 160 and its hinge element 162, preferably being formed of metal. Of course, the bottom plate 170 is also metal to facilitate electrical contact.

The ability to form the housing 122 of plastic simplifies the manufacturing of the trap and enables the incorporation of additional features at minimal cost. The housing 122 has a bottom wall 124, upstanding peripheral walls 126, and a roof 127. The roof 127 includes a cover 128 which carries a switch or button 152. The switch 152 toggles from an "on" or standby position to an "off" or reset position. The trap 120 is activated by way of the switch 152.

To indicate activation of the trap, an LED 154 is mounted on the cover 128 and electrically connected to the trap. The LED 154 turns "on" during activation of the trap and provides a visual indication to the user. The cover 128 extends over an electronics area generally indicated with numeral 180 with a battery lid 129. The battery lid 129 covers an area 182 which contains a power supply 184. Of course, it has been contemplated to further simplify the assembly by using a single roof.

The bottom wall or base 124, peripheral wall 126, back wall 134 and roof 127 together define an enclosure for holding the targeted animal. Portions of the housing are movable between a closed position in which the captured animal is retained within the enclosure, and an opened position in which access is provided to the enclosure to remove the electrocuted animal therefrom. For example, the roof 127 may pivotally rotate about hinges 135, 136 to open the trap for disposal of the carcass of an electrocuted animal.

The inclined plane trap assembly includes outer side 126 and a parallel inner side 137 defining the elongated passageway 130. An entrance opening 132 at one end of the passageway 130 communicates with the exterior of the housing through an aperture in one of the peripheral walls of the housing. A back wall 134 at the other end of the of the passageway 130 is one of the peripheral walls.

The trap assembly further includes a floor member 140 extending along the passageway 130 intermediate the sides. The floor member 140 has a first end portion 142 juxtaposed to the entrance opening 132 and an opposite second end portion 144 juxtaposed to the back wall 134. A pivot element 145 underlies and supports the floor member 140 intermediate its end portions for tilting movement of the floor member 140 between a first position in which the first end portion 142 is lowered and the second end portion 144 is raised and a second position in which the first end portion 142 is raised and the second end portion 144 is lowered. A floor galvanized pin or carbon steel wire 147 extends through pivot 145 for permitting floor 140 to rotate or, more specifically, to perform a teeter-totter effect.

A door member 160 has bottom edge portions 165 and a top edge 164 with a hinge element 165 secured to the bottom edge portions 165 adjacent to the entrance opening 132 for pivotal movement of the door member 160 between a lowered position in which the door member 160 rests on the first end portions 142 of the floor member 140 when the floor member 140 is in its first position to provide access to the passageway 130 by a targeted animal through the entrance opening 132 and a raised position where the door member 160 blocks the entrance opening. A door galvanized pin or carbon steel wire 167 extends through hinge element 165 for permitting door 160 to rotate.

The door member 160 is biased toward its lowered position because the top edge 164 engages the roof 127 before it reaches its vertical position. The weight 146 of the door member 160 on the first end portion of the floor member 140 when the door member is in its lowered position maintains the floor member 140 in its first position, and the weight of an animal on the floor member 140 tilts the floor member 140 to its second position when the animal 150 passes from the entrance opening 132 beyond the pivot element 145 to thereby lift the door member 160 to its raised position. This is a teeter-totter movement of the floor member 140.

A power supply 184 provides power to the trap. The supply 184 can be two AA batteries or some other combination. Additionally, it has been contemplated the trap could be electrically connected to a wall outlet. The power supply 184 in the battery form sits in the power supply area 182. The battery cover 129 is snap fitted for easy entering of the area 182 to replace expired batteries.

A bottom plate 170 is positioned near the back wall 134 and extends parallel to the bottom wall 124. A portion of the bottom plate 170 is in physical contact with the floor member 140 when the floor member 140 is moved from its first position to its second position. A circuit member 186 is electrically connected to the power supply 184 to convert the power to electricity.

A floor electrical connection member 188 receives the electricity from the circuit member 186. The floor electrical connection member 188 also connects to the floor member 140 so that electricity can be provided to the floor member 140. This member 188 is primarily a wire which is soldered at or near the pivot 145.

A similar wire forms a bottom electrical connection member 190. This wire 190 is for receiving the electricity from the circuit member 186 and for connecting to the bottom plate 170 near the back wall 134 at connection point 192. This bottom electrical connection member 190 provides electricity to the bottom plate 170.

Figure 4:
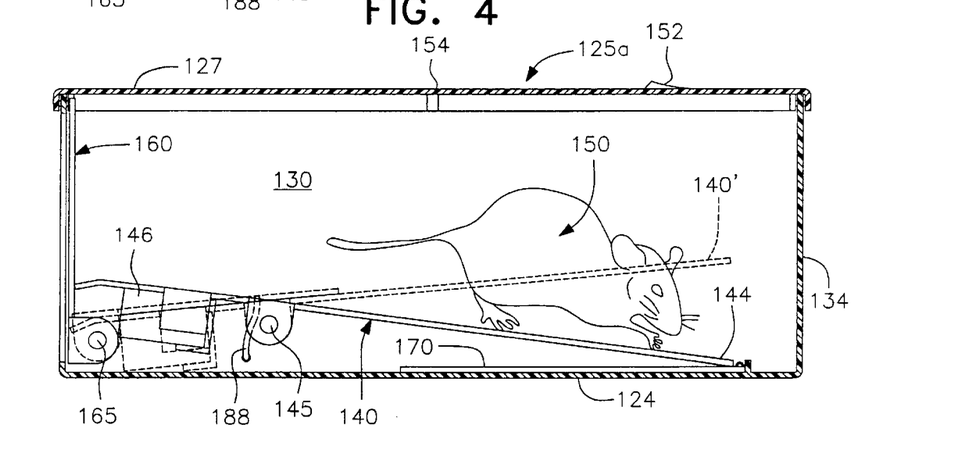
FIG. 4 is a fragmentary longitudinal cross-sectional view of the electronic animal trap with the pivotal floor and door members shown in dotted lines in their alternate position and a captured animal for removal according to the present invention with a partial wire and ground plate shown.
Figure 5:
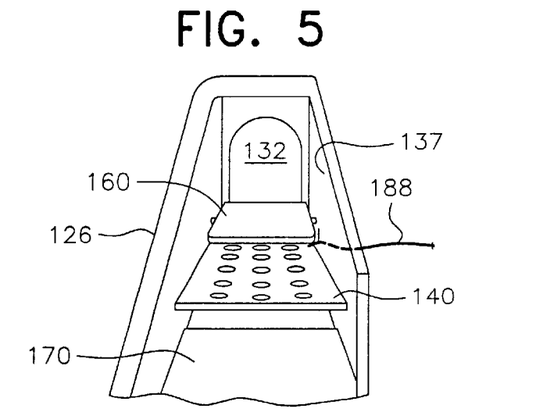
FIG. 5 is a fragmentary perspective view into the trap assembly of the electronic animal trap of the present invention from the back wall.

As shown in FIG. 4, the weight of the animal 150 on the floor member tilts the floor member to its second position. When the animal 1 50 passes from the entrance opening 132, beyond the pivot element 145, its weight lifts the door member 160 to the raised position and blocks the animal 150 from leaving the trap.

At this point, the bottom plate 170 electrically contacts the floor member 140 causing electricity to flow through the bottom plate 170 and to the floor member 140, thus completing the circuit. This in turn, electrocutes the animal 150 which is in contact with the floor member 140.

Figure 6:
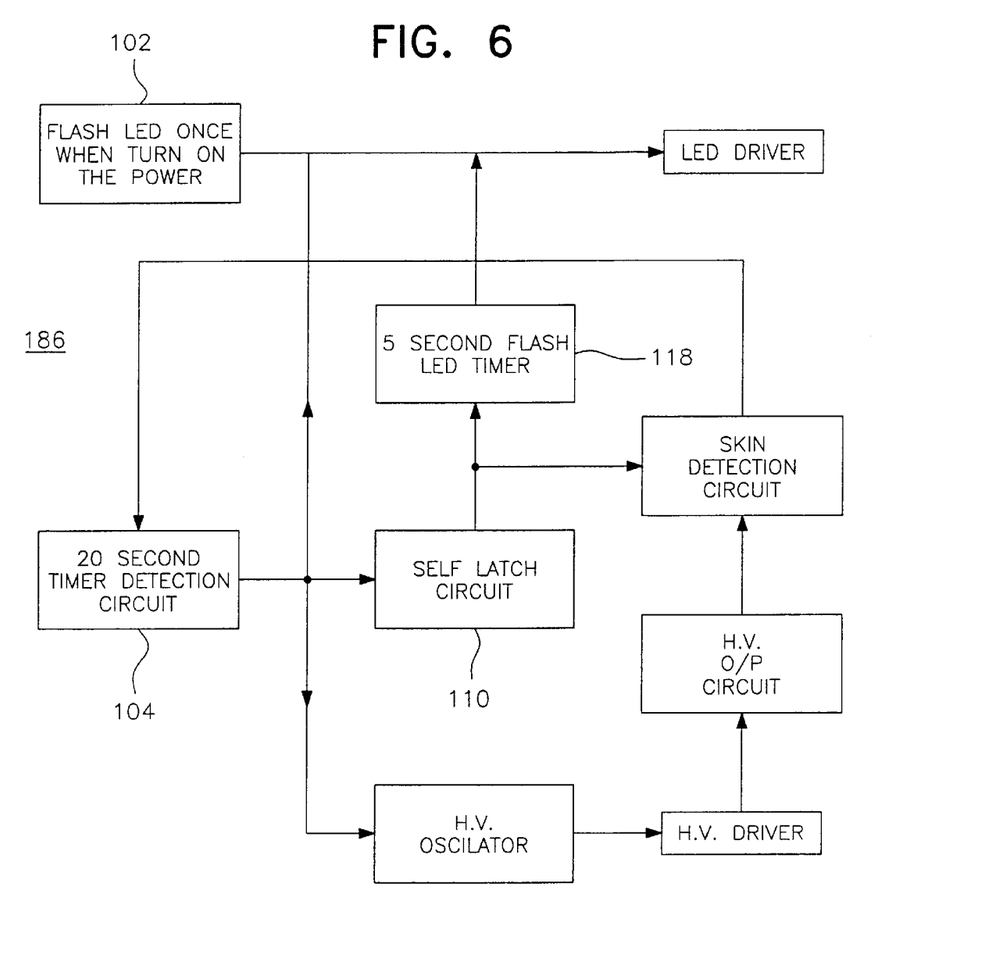
FIG. 6 is a block diagram electronic circuit of the escape-proof electronic animal trap of the present invention.
Figure 7:
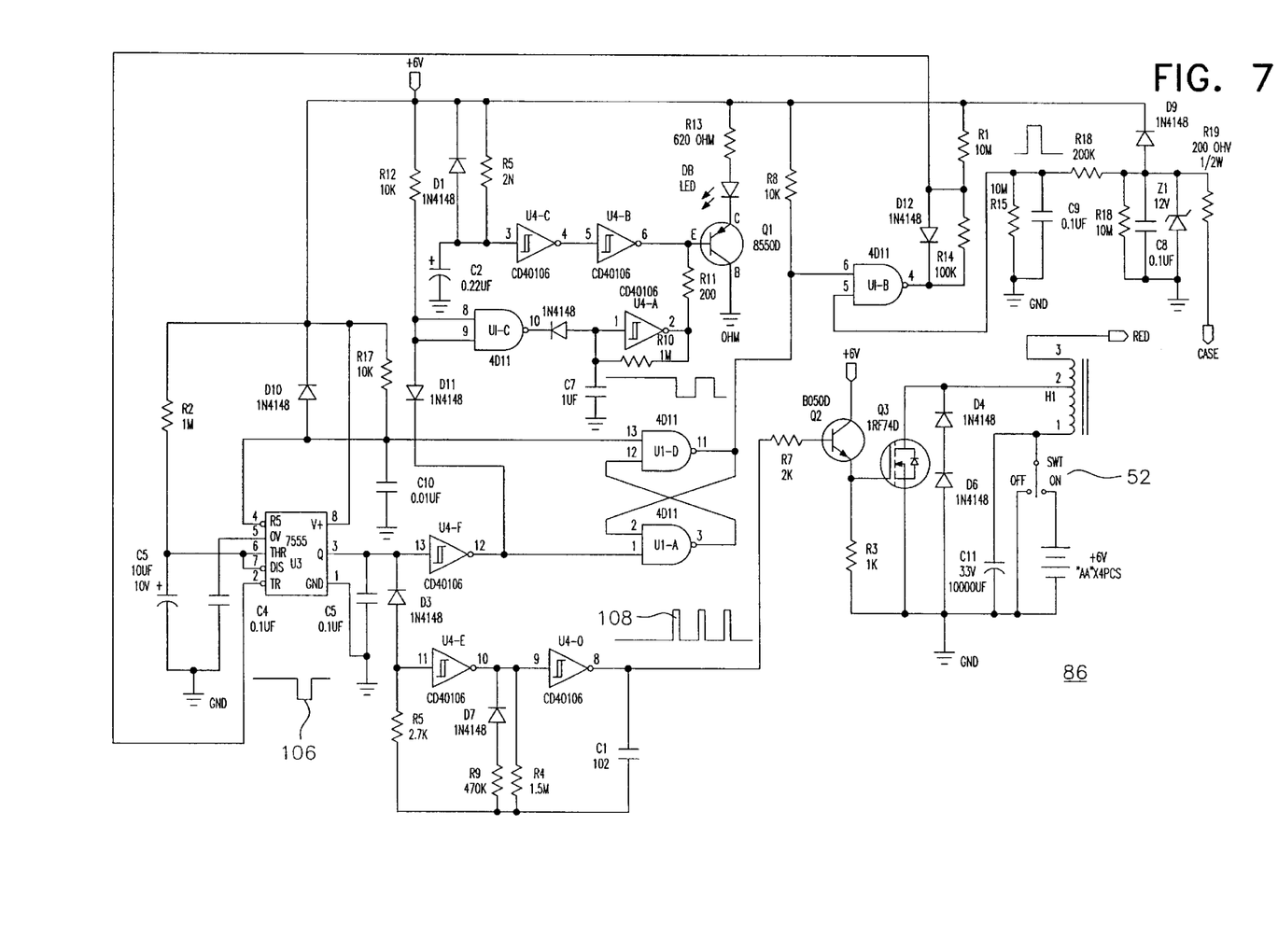
FIG. 7 is a schematic illustration of the electronic circuit for the electronic animal trap of the present invention.

FIG. 6 illustrates a block diagram of the electrical circuit and FIG. 7 illustrates the same circuit in schematic form. In operation, when power is applied to the circuit member 186, in the form of either batteries such as two AA batteries or else from an electrical outlet, six volts are added to the R7, D11 and UAB, U4C power up circuit member 186 to trigger Q1 and make the LED circuit 102 flash once. The circuit member 186 is formed by high voltage output transformer, floor member 140 which is embodied as a metal plate, bottom plate 170 which is embodied as a kill metal plate, and the circuit formed by R13, D2, R1, and U1B. When the skin or any part of the mouse 150, or animal touches the plate 140 and brings it in to contact with kill metal plate 170, trigger U1B pin 5 and then pin 4 of U1B outputs a negative pulse 106 to trigger the timing circuit 104.

The timing circuit 104, formed by U3 (a 7555 timer) and the related components, receives the negative pulse 106, then the circuit 104 turns on for 20 seconds and pin 3 (OUTPUT) will output a logic high signal to trigger U4F and also trigger the pulse generator circuit (U4E, U4D), then a pulse 108 will drive the transistor Q2 and Q2 will drive the power mosfet IRF741. At this point, the transformer will step up the output pulse to about 2.5–3 KV to instantaneously kill the mouse 150. During the same period, the oscillator circuit UAA, C7,rG will drive the transistor Q1 which in turn causes a 5 second flash timer 118 to generate the LED flash at the end of the period.

The timing circuit 104, formed by U3 (a 7555 timer) and the related components, receives the negative pulse 106, then the circuit 104 turns on for 20 seconds and pin 3 (OUTPUT) will output a logic high signal to trigger U4F and also trigger the pulse generator circuit (U4E, U4D), then a pulse 108 will drive the transistor Q2 and Q2 will drive the power mosfet IRF741. At this point, the transformer will step up the output pulse to about 2.53 KV to instantaneously kill the mouse 150. During the same period, the oscillator circuit UAA, C7, rG will drive the transistor Q1 which in turn causes a 5 second flash timer 108 to generate the LED flash at the end of the period.

A self latching circuit 110 is also provided. Once the circuit member 186 is triggered by mouse 150 and the circuit member 186 starts the kill period, then the circuit can not be triggered again due to the self latch circuit 110 formed by U1A, U1D, U4F. The self latching circuit 110 will hold down the trigger signal so that the entire unit must be powered off first and then on again by wave of switch 152 to put the unit into reset. Normally, during this time, the carcass can and should be removed from the trap. Once the carcass is removed the trap can be reset and ready to operate again.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. In an electric animal trap including a housing having a bottom wall, upstanding peripheral walls, and a cover, the bottom wall, peripheral walls and cover together defining an enclosure for holding a targeted animal, portions of the housing being movable between a closed position in which a captured animal is retained within the enclosure, and an opened position in which access is provided to the enclosure to remove electrocuted animal therefrom, and an inclined plane trap assembly including sides defining an elongated passageway, an entrance opening at one end of the passageway communicating with the exterior of the housing through an aperture in one of the peripheral walls of the housing, a back wall at the other end of the of the passageway, the trap assembly further including a floor member extending along the passageway intermediate the sides, the floor member having a first end portion juxtaposed to the entrance opening and an opposite second end portion juxtaposed to the back wall, a pivot element underlying and supporting the floor member intermediate its end portions for tilting movement of the floor member between a first position in which the first end portion is lowered and the second end portion is raised, and a second position in which the first end portion is raised and the second end portion is lowered, and a door member having bottom edge portions and a top edge, a hinge element secured to the bottom edge portions of the door member adjacent to the entrance opening for pivotal movement of the door member between a lowered position in which the door member rests on the first end portion of the floor member when the floor member is in its first position to provide access to the passageway by a targeted animal through the entrance opening, and a raised position in which the door member is lifted by movement of the first end portion of the floor member when the floor member is moved from its first position to its second position, the door member, in its raised position, blocking return to the entrance opening by the animal on the floor member, the door member being biased toward its lowered position, the weight of the door member on the first end portion of the floor member when the door member is in its lowered position maintaining the floor member in its first position, and the weight of the animal on the floor member tilting the floor member to its second position when the animal passes from the entrances opening beyond the pivot element to thereby lift the door member to its raised position, the improvement which comprises:

a power supply for providing power to the trap;

a bottom plate being positioned near said back wall and extending parallel to said bottom wall with a portion of said bottom plate being in contact with said floor member when the floor member is moved from its first position to its second position;

circuit member electrically connected to said power supply for converting said power to electricity;

floor electrical connection member for receiving said electricity from said circuit member and connecting to said floor member to provide electricity to said floor member; and bottom electrical connection member for receiving said electricity from said circuit member and connecting to said bottom plate to provide electricity to said bottom plate and the weight of the animal on the floor member tilting the floor member to its second position when the animal passes from the entrances opening beyond the pivot element to thereby lift the door member to its raised position to eliminate an exit of the animal from the trap, and said bottom plate electrically contacting said floor member causing said electricity to flow through said bottom plate and said floor member to electrocute the animal in contact with the floor member.

2. The electric animal trap of claim 1, wherein the top edge of the door member engages the undersurface of the roof when the door member reaches a vertical orientation whereby the weight of the door member biases the door member about the hinge element towards the lowered position.

3. The electric animal trap of claim 1, wherein the housing is rectangular and the peripheral walls of the housing including a pair of opposed, parallel side walls and a pair of opposed parallel end walls, one aperture in one of said end walls and a trap assembly inside the housing, said trap assembly having entrace opening communicating with said aperture.

4. The electric animal trap of claim 1, wherein portions of the cover of the housing define the roof of the trap assembly passageway, a circuit area and a power supply area.

5. The electric animal trap of claim 1, wherein portions of the peripheral walls of the housing define one of the sides of the trap assembly passageway.

6. The electric animal trap of claim 4, wherein portions of the peripheral walls of the housing define one of the sides of the trap assembly circuit area.

7. The electric animal trap of claim 4, wherein portions of the peripheral walls of the housing define one of the sides of the trap assembly power supply area.

8. The electric animal trap of claim 4, wherein portions of the peripheral walls of the housing define one of the sides of the trap assembly circuit area.

9. The electric animal trap of claim 1, wherein said housing is formed of plastic.

10. The electric animal trap of claim 1, wherein said power supply is at least one battery.

11. The electric animal trap of claim 1, wherein said bottom plate is formed of galvanized steel.

12. The electric animal trap of claim 1, wherein said circuit member is formed of electronic components including at least one of the following a timing circuit, a self latch circuit, a transistor, and a pulse generator circuit.

13. The electric animal trap of claim 1, wherein said floor electrical connection member is an insulated wire and is soldered to form an electrical connection.

14. The electric animal trap of claim 1, wherein said bottom electrical connection member is an insulated wire and is soldered to form an electrical connection.

* * * * *